(12) United States Patent
du Quesne et al.

(10) Patent No.: US 8,522,851 B2
(45) Date of Patent: Sep. 3, 2013

(54) MACHINE FOR FITTING AND REMOVING TIRES

(75) Inventors: Bertrand du Quesne, Schaerbeek (BE); Francis du Quesne, Aartselaar (BE)

(73) Assignee: Bertrand Du Quesne, Schaerbeek (BE)

( * ) Notice: Subject to any disclaimer, the term of this patent is extended or adjusted under 35 U.S.C. 154(b) by 398 days.

(21) Appl. No.: 12/884,937

(22) Filed: Sep. 17, 2010

(65) Prior Publication Data

US 2011/0067818 A1 Mar. 24, 2011

(30) Foreign Application Priority Data

Sep. 21, 2009 (EP) .................................... 09170819

(51) Int. Cl.
*B60C 25/132* (2006.01)
*B60C 25/12* (2006.01)
*B60C 25/122* (2006.01)
*B60C 25/00* (2006.01)
*B60C 25/128* (2006.01)

(52) U.S. Cl.
USPC ....... 157/1.17; 157/1.22; 157/1.26; 157/1.24; 157/1.28; 157/1.49

(58) Field of Classification Search
USPC .............................. 157/1.17, 1.22–1.28, 1.49
See application file for complete search history.

(56) References Cited

U.S. PATENT DOCUMENTS

| 4,676,291 | A | * | 6/1987 | Bolger | 157/1.17 |
| 4,969,498 | A | * | 11/1990 | Sheets | 157/1.17 |
| 6,276,423 | B1 | * | 8/2001 | Goracy | 157/1.17 |

(Continued)

FOREIGN PATENT DOCUMENTS

| CN | 201275992 Y | 7/2009 |
| DE | 44 15 064 A1 | 4/1995 |
| EP | 1 593 533 A | 5/2005 |

OTHER PUBLICATIONS

English language Abstract for EP 1593533.

(Continued)

*Primary Examiner* — Monica Carter
*Assistant Examiner* — Danny Hong
(74) *Attorney, Agent, or Firm* — Christopher Casieri

(57) ABSTRACT

Machine for fitting and removing a tire (1) from a rim (2) of a wheel (3). The machine comprises a frame (10), a rotating table (11) in order to attach the wheel thereto by its rim and to rotate the rim about its axis (Y), and a tool (12) for fitting and/or removing the tire from the rim. The tool (12) is connected to the frame (10) by means of a movable structure (20) capable of moving the tool (12) horizontally and vertically to its working position situated close to the proximal edge (4) of the rim (2) when the wheel (3) is mounted on the rotating table (11). The movable structure (20) comprises four arms (A, B, C, D) connected together in twos by means of four pivots (p, q, r, s) the axes (X1, X2, X3, X4) of which are parallel with one another. One of the arms (A) is secured to the frame (10) and the tool (12) is connected to one of the other arms (B, C, D). The tool (12) can therefore be moved, horizontally and vertically, exclusively by means of rotary connections between the tool (12) and the frame (10). Moreover, the lever arm between the tool (12) and the movable structure (20) is constant and can be relatively short, irrespective of the diameter of the rim (2).

8 Claims, 6 Drawing Sheets

(56) References Cited

U.S. PATENT DOCUMENTS

| | | | |
|---|---|---|---|
| 7,341,090 B2* | 3/2008 | Gonzaga | 157/1.17 |
| 7,882,882 B2* | 2/2011 | Cunningham | 157/1.24 |
| 2010/0108963 A1* | 5/2010 | Zhu | 254/2 |

OTHER PUBLICATIONS

English language Abstract for DE 4415064.

English language Abstract for CN 201275992 Y.

* cited by examiner

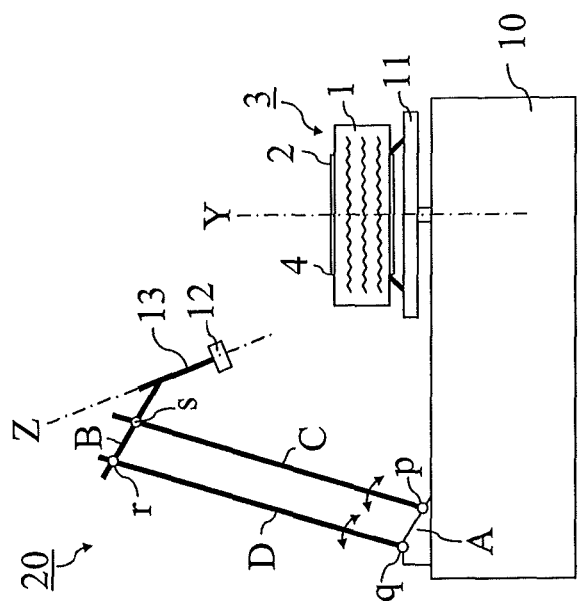
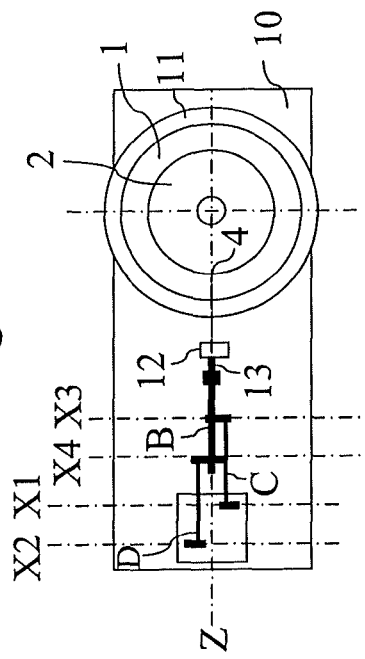
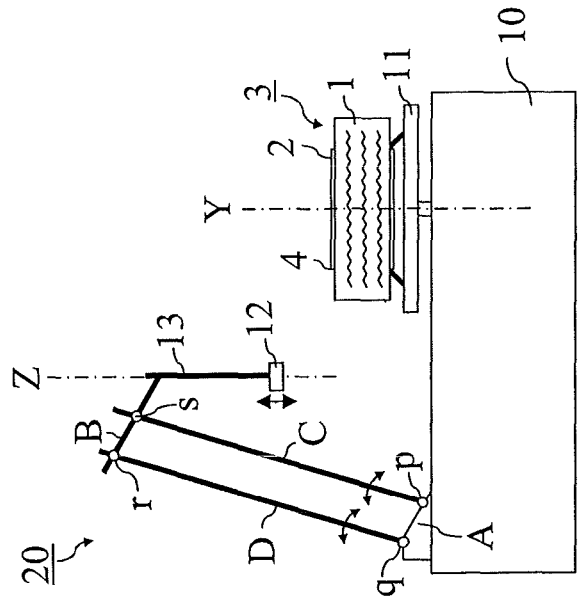
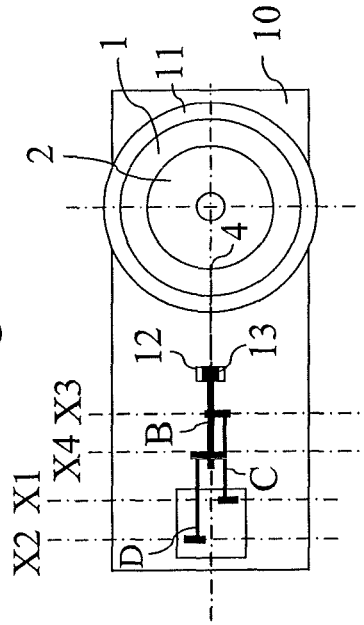

MACHINE FOR FITTING AND REMOVING TIRES

CROSS-REFERENCE TO RELATED APPLICATION

The present patent application claims the right of priority under 35 U.S.C. §119 (a)-(d) of European Patent Application No. EP 09170819.8, filed Sep. 21, 2009.

BACKGROUND OF THE INVENTION

1. Field of the Invention

The invention relates to a machine for fitting and removing a tire from a rim of a wheel, comprising a frame, a table capable of attaching the rim thereto and of rotating said rim in a centered manner about an axis (Y), and a tool for fitting and removing the tire.

2. Prior Art

Such machines have been known for a long time and make it possible to fit and/or remove a tire from a rim, for example of a wheel of a motor vehicle or truck or motorcycle. To carry out this operation, the rim is first attached to the table so that its axis coincides with the axis of rotation of the table. Then the fitting/removal tool is brought over the rim in order to position it close to the edge of the rim. The tire is then removed and/or fitted in a known manner.

The known machines have hitherto proposed to bring the fitting/removal tool close to the edge of the rim according to two different types of mechanism.

According to a first type of mechanism, known for example from patent EP 1775148, the machine comprises a vertical column secured to the frame and a horizontal movable arm mounted so as to rotate about the axis of the vertical column. This movable arm has, at its distal end, a vertical bar at the end of which the tool is attached. Said vertical bar is mounted in vertical translation relative to the movable arm.

With such a mechanism, the tool can be brought close to the edge of the rim, first by making the horizontal arm pivot until the tool is level with the edge of the rim, and then by making the bar slide vertically until the tool is virtually in contact with the edge of the rim. The mechanism is then immobilized in this position before the tire is fitted or removed.

However, with such a mechanism, the overhang of the tool relative to the vertical column is relatively large. This has the drawback that the mechanism—and in particular the horizontal arm—will sustain relatively large deformations when the tire is fitted or removed from the rim, which risks causing a contact between the tool and the rim and thus damaging the rim. Moreover, following the pivoting of the horizontal arm, the azimuthal position of the tool relative to the rim will vary with the diameter of the rim so that, with such a mechanism, it is not possible to position the tool in an optimal manner for various diameters of rim.

These two problems are all the more marked if the difference between the largest and the smallest diameter of rim is great.

According to a second type of mechanism, known for example from patent EP 1593533, the machine comprises a vertical column secured to the frame and a horizontal movable arm mounted in translation perpendicularly to the vertical column and radially relative to the rim. This movable arm also has, at its distal end, a vertical bar at the end of which the tool is attached. Said vertical bar is mounted in vertical translation relative to the movable arm.

With such a mechanism, the tool can be brought close to the edge of the rim, first by making the horizontal arm slide until the tool is in line with the edge of the rim, and then by making the bar slide vertically until the tool is virtually in contact with the edge of the rim. The mechanism is then immobilized in this position before the tire is fitted or removed.

Therefore, with this second type of mechanism, the azimuthal position of the tool relative to the rim will not vary with the diameter of the rim to be treated.

However, apart from the sliding mechanism of the horizontal arm, a clearance will appear over time between the horizontal arm and the vertical column, thus causing a misalignment of the tool relative to the rim and a risk of contact with the latter.

Moreover, with such a mechanism, the overhang of the tool relative to the vertical column is also relatively great, and all the more so if the difference between the largest and the smallest diameter of rim is great. It therefore has, from this point of view, the same drawbacks as the first mechanism.

SUMMARY OF THE INVENTION

One object of the invention is to provide a machine for fitting and removing tires which does not have one or more of the drawbacks of the known machines.

For this purpose, the machine according to the invention is characterized in that it comprises a movable structure having four arms (A, B, C, D), said arms being connected together two by two by means of four pivots (p, q, r, s) having respectively four pivot axes (X1, X2, X3, X4) parallel with one another, and in that a first of the four arms (A) is secured to the frame, and in that the fitting and removal tool is connected to one of the other arms (B, C, D).

By virtue of such a machine, the tool can be brought close to one edge of the rim by means of mechanical connections which are exclusively of the rotary type, which reduces the problems of clearance.

Moreover, in such a movable structure, the overhang of the tool relative to the arms C and D is constant, irrespective of the diameter of the rim. By virtue of this, the maximum lever arm between the tool and the arms C and D can be shorter than the maximum lever arm between the tool and the vertical column of the known machines. This makes it possible to reduce the stresses and therefore the deformations generated when the tool fits or removes the tire. For the same dimension, this gives a more rigid machine.

Another object of the invention is to keep constant the horizontal orientation of the tool relative to a radius of the rim passing through the point of contact between the tool and the edge of the rim, irrespective of the diameter of the rim put in place on the machine. Specifically this makes it possible to always ensure a correct alignment of the tool relative to the edge of the rim.

For this purpose, the machine according to the invention is preferably characterized in that the axis of rotation (Y) of the table is included in an orbital plane (P1) of the tool. "Orbital plane of the tool" should be understood to be the plane in which the tool moves when the movable structure is set in motion at its pivots (p, q, r, s) in order to bring the tool to or away from its working position.

In this manner, the tool will move exclusively in a radial manner relative to the rim. Therefore, when the tool is correctly aligned relative to a rim of a given diameter, it will remain correctly aligned when a rim of a different diameter is put in place on the machine.

Another object of the invention is to keep constant the vertical inclination of the tool relative to a plane formed by the edge of the rim when the movable structure is set in motion along its pivots (p, q, r, s). Specifically this makes it possible to ensure a correct alignment of the tool relative to the edge of the rim, irrespective of the diameter of the rim put in place on the machine.

For this purpose, the machine according to the invention is preferably characterized in that the four pivots substantially form a parallelogram and in that the tool is connected to a second of the four arms (B) opposite to the first arm (A).

Specifically this allows the tool to move parallel to itself when the movable structure is set in rotation.

Another object of the invention is to prevent the tool from touching the rim following deformations of the movable structure when the tool is in the process of fitting or removing a tire.

For this purpose, the machine according to the invention is preferably characterized in that the third arm (C) and/or the fourth arm (D) are/is offset relative to the orbital plane (P1) of the tool, in the direction contrary to the direction of rotation of the table.

By virtue of this arrangement, the movable structure will deform so that the tool will move away from the rim when it is in the process of fitting or removing a tire.

BRIEF DESCRIPTION OF THE FIGURES

These aspects and other aspects of the invention will be clarified in the detailed description of particular embodiments of the invention, reference being made to the drawings of figures, in which:

FIGS. 7 and 8 show respectively a profile and top view of a machine according to another preferred version of the invention;

FIGS. 9 and 10 show respectively a profile and top view of a machine according to yet another preferred version of the invention;

The drawings of the figures are not to scale.

In general, similar elements are denoted by similar references in the figures.

DETAILED DESCRIPTION OF PARTICULAR EMBODIMENTS

Since machines for fitting and removing a tire from a rim of a wheel are known in general, their operating principle will not be described below.

The focus will therefore be on the particular aspects of the machine according to the invention, namely the mechanism which makes it possible to bring the fitting/removal tool up to its working position near the wheel after having fitted the latter onto the table of the machine, and then to disengage said tool in order to be able to easily remove the wheel from the table. The working position of the tool is situated virtually against one edge of the rim. Preferably, a slight space is maintained between the tool and the edge of the rim so as not to damage the rim when the tool is in operation.

Figure 2:
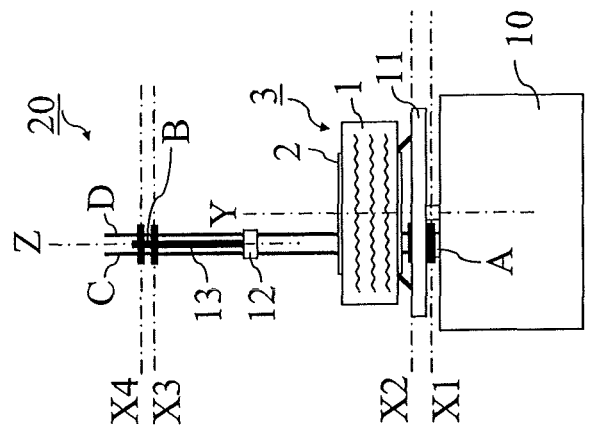
FIG. 2 shows schematically a front view of the machine of FIG. 1.
Figure 1:
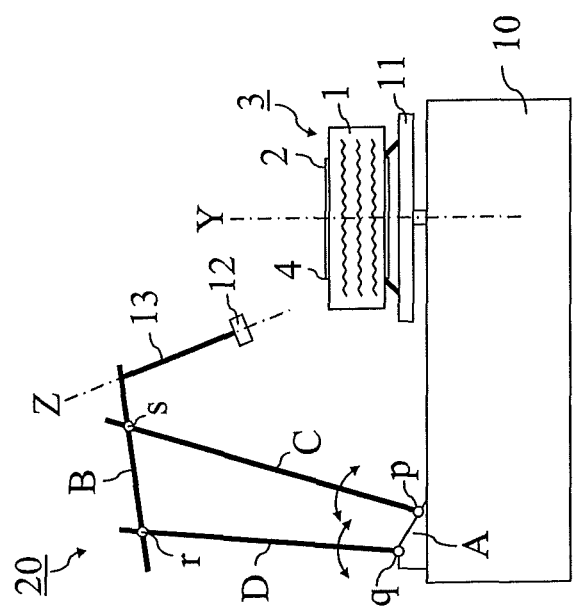
FIG. 1 shows schematically a profile view of a machine according to the invention.
Figure 3:
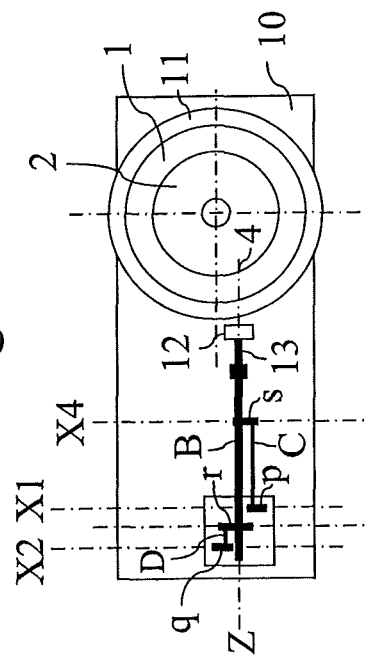
FIG. 3 shows schematically a top view of the machine of FIG. 1.

As illustrated in FIGS. 1, 2 and 3, a machine for fitting and removing a tire (1) from a rim (2) of a wheel (3) according to the invention comprises a fixed frame (10) and a table (11) that rotates on an axis (Y) to which it is possible to attach the rim (2) of the wheel (3) in a centered manner relative to the axis (Y). The table (11) does not necessarily have to be fitted to the frame (10); it is sufficient for the table (11) to be directly or indirectly secured to the frame (10).

For reasons of ease of the present description, the axis (Y) is a vertical axis. However, the invention is not limited to such a configuration and it should be understood that the axis (Y) of the table may have any other orientation in space, such as for example a horizontal orientation.

The machine according to the invention also comprises a movable structure (20) having four arms: a first arm (A), a second arm (B), a third arm (C) and a fourth arm (D). These four arms (A, B, C, D) are connected together two by two by means of four pivots (p, q, r, s) having respectively four pivot axes (X1, X2, X3, X4). These four pivot axes (X1, X2, X3, X4) are parallel with one another, as illustrated in FIG. 1. The arms do not necessarily have to be rectilinear. Each arm may have any shape provided that the movable structure (20) can make a rotary movement about its pivots (p, q, r, s).

The first arm (A) is secured to the frame (10). It may, for example, be a complete part secured to the frame (10) or else indeed be a portion of the frame (10). What is important is that the pivots p and q are connected together and to the frame (10).

The fitting and removal tool (12) is connected to one of the other arms (B, C, D) by means of a tool holder (13), by, for example, a bar. In the example of FIG. 1, the tool (12) is connected to the second arm (B), but it could just as well be connected to the third arm (C) or to the fourth arm (D).

The order in which the four arms (A, B, C, D) follow one another in a direction along a pivot axis (X1, X2, X3, X4) is of no importance. The order as illustrated in FIG. 3 is purely an example.

Therefore, when the movable structure (20) is set in motion about its pivots (p, q, r, s), the tool (12) will move horizontally and vertically relative to the rim (2), which will make it possible to bring the tool (12) nearer to or further from its working position at the edge of the rim (4). This movement can be generated by human force, for example by an operator who actuates the movement of the movable structure (20), or by another motive force, for example an electric motor. The movement may be controlled manually or automatically.

Preferably, the machine comprises at least one end-of-travel device in order to limit—in one direction and/or the other—the amplitude of the movement of the movable structure (20) about its pivots (p, q, r, s). Preferably, the machine also comprises means for immobilizing the movable structure (20) in one of its positions, in particular in the position in which the tool (12) is in its working position. Conventional immobilization means may be used for this purpose.

Figure 5:
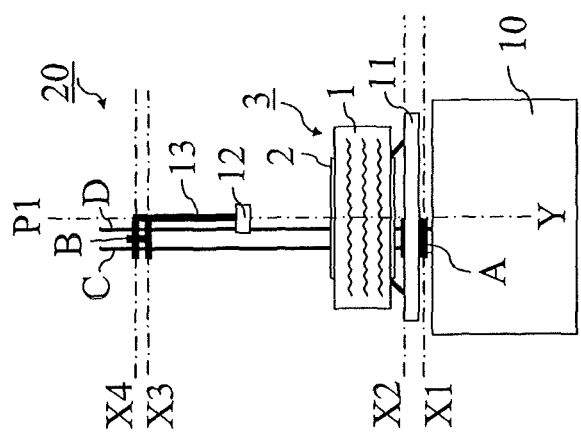
FIGS. 4, 5 and 6 show respectively a profile, front and top view of a machine according to a preferred version of the invention.
Figure 4:
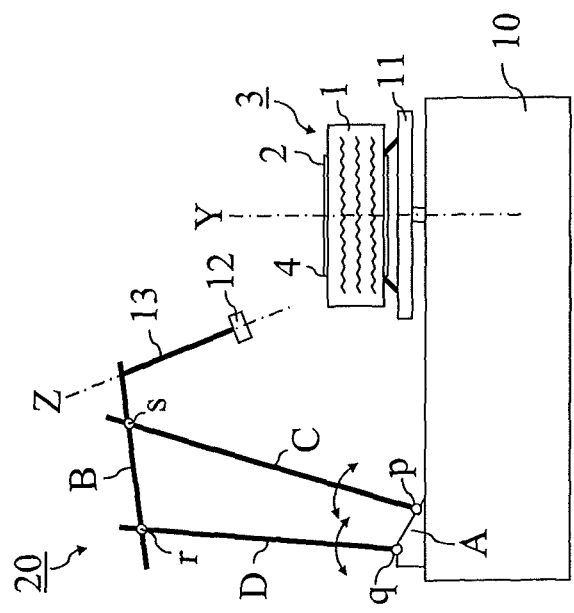
Figure 6:
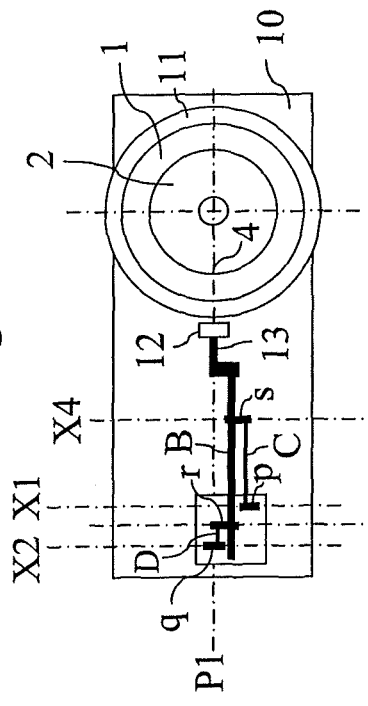

FIGS. 4, 5 and 6 show a machine according to a preferred version of the invention.

According to this embodiment, the axis (Y) of the table (11) is substantially in an orbital plane (P1) of the tool (12), as is best shown in FIGS. 5 and 6. "Orbital plane of the tool" should be understood to be the plane in which the tool (12) moves when the movable structure (20) is set in motion about its pivots (p, q, r, s) in order to bring the tool closer to or further from its working position, as indicated by the double arrows in FIG. 4. This makes it possible to move the tool (12) in an exclusively radial manner relative to the rim (2).

FIGS. 7 and 8 show a machine according to another preferred version of the invention.

According to this embodiment, the four pivots (p, q, r, s) substantially form a parallelogram and the tool (12) is connected to a second of the four arms (B) opposite to the first arm (A). It should be understood by this that a parallelogram is obtained when the intersections between the pivot axes (X1, X2, X3, X4) and a plane perpendicular to said pivot axes are connected by straight-line segments.

In this manner, the tool (12) will move parallel to itself when the movable structure (20) is set in motion on its pivots (p, q, r, s) and the tool (12) will always retain the same inclination relative to a horizontal plane formed by an edge of the rim (2). It should again be noted that the arms (A, B, C, D) do not necessarily have to be rectilinear as illustrated in FIG. 7, but that they may have any shape.

FIGS. 9 and 10 show a preferred embodiment of the machine as illustrated in FIGS. 7 and 8.

According to this preferred embodiment, the tool (12) is connected to the second arm (B) so that an axis (Z) of the tool (12) is parallel with the axis (Y) of the table (11). This axis (Z) is an axis passing through the tool (12) and perpendicular to the plane formed by the edge of the rim (2) when the tool (12) is in the nominal working position on the edge (4) of the rim (2).

Since the four pivots form—in this preferred embodiment—a parallelogram, the tool (12) will move parallel to itself when the movable structure (20) is set in motion, and the tool (12) will therefore always be placed in a good working position on the edge (4) of the rim (2), irrespective of the diameter of the rim (2) put in place on the table (11).

Preferably, the tool (12) is connected to one of the other arms (B, C, D) in a manner so as to be movable in translation along the axis (Z) of the tool (12). This makes it possible to adjust the distance between the tool (12) and the edge (4) of the rim (2) independently of the angle of rotation of the movable structure (20) about its pivots (p, q, r, s).

FIGS. 9 and 10 show for example the case of a tool (12) supported by a tool holder (13), such as for example an oblong bar, the axis of which is parallel to or indistinguishable from the axis (Z) of the tool (12). In such a case, the tool holder (13) may for example be mounted in translation along the axis (Z) on the second arm (B) with well known means.

Figure 11:
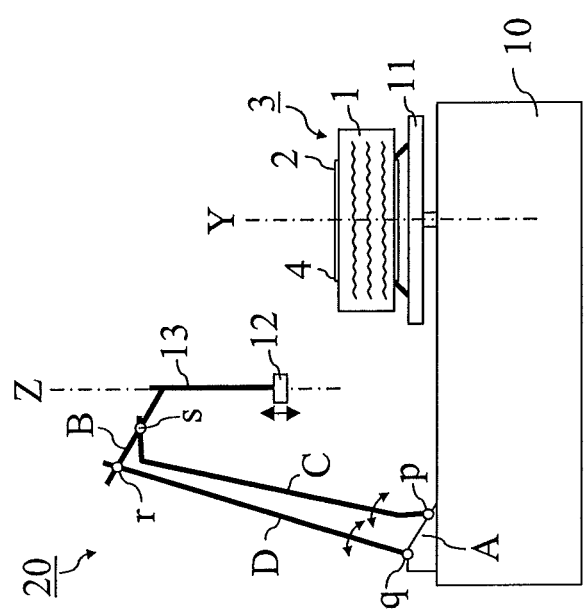
FIG. 11 shows a profile view of a machine according to yet another preferred version of the invention.

FIG. 11 shows a machine according to another preferred version of the invention.

According to this embodiment, the third arm (C) is of concave shape when it is seen from the tool (12). The third arm (C) may for example have a shape of a "U" of which the branches open out toward the pivots (p, s) connecting said third arm to the first and to the second arms.

This makes it possible to obtain a better clearance for the tool (12) when the latter is placed in the rest position (in opposition to its working position) in order to be able to remove the wheel (3) after a tire (1) has been fitted. Preferably, the concavity is such that the movable structure (20) can be positioned beyond its top dead center.

This concave shape also makes it possible to bring the pivot "p" closer to the table (11) so as to obtain a more compact machine.

Figure 13:
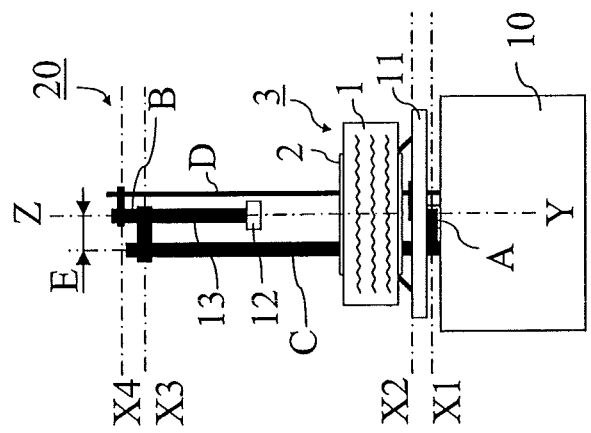
FIGS. 12, 13 and 14 show respectively a profile, front and top view of a machine according to yet another preferred version of the invention.
Figure 12:
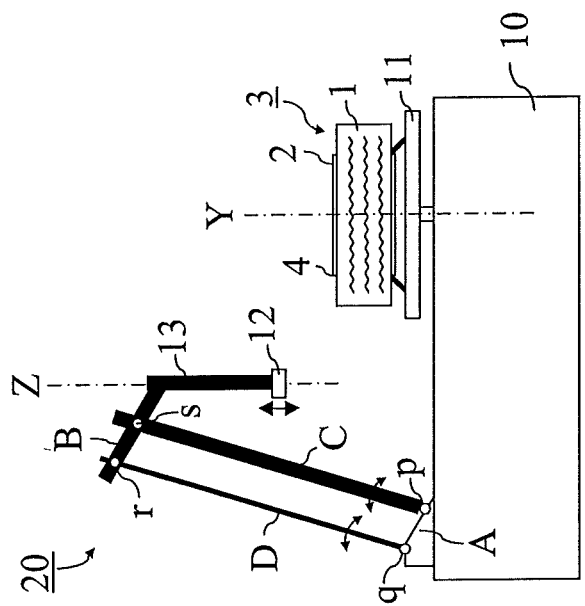
Figure 14:
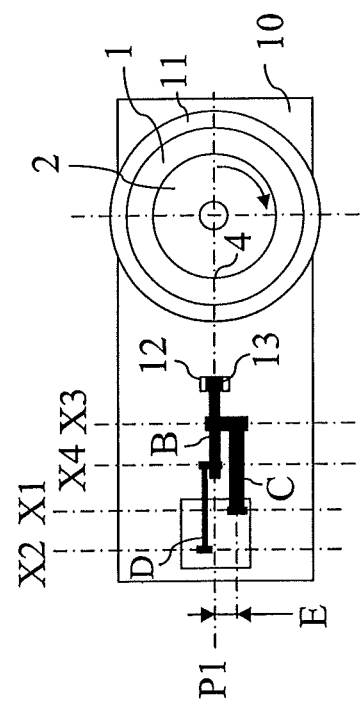

FIGS. 12, 13 and 14 show an embodiment of a machine according to another preferred version of the invention.

According to this embodiment, the third arm (C) is oversized relative to the fourth arm (D). This is therefore an embodiment in which the third arm (C) will absorb the majority of the stresses due to the forces of friction between the tire (1) and the tool (12) when the tool (12) is engaged in fitting or removing the tire (1) and when the table (11) is rotating (tangential forces at the rim at the point of contact between the tire and the tool). In an extreme case, the fourth arm (D) may for example be a simple strip or a cable, while the third arm (C) is a beam.

The position of the third arm (C) is offset in the direction contrary to the direction of rotation of the table (11) relative to the orbital plane (P1) of the tool (12). The direction of rotation of the table (11) is indicated by an arrow in FIG. 14.

By virtue of this configuration, the resultant force on the movable structure (20) will be directed toward the outside of the rim (2) and the deformation of the movable structure (20) following said friction forces will result in moving the tool (12) away from the rim (2). This effect is particularly advantageous because it makes it possible to prevent the tool (12) coming into contact with the rim (2) and therefore scratching it.

According to another embodiment of this preferred version of the invention, the fourth arm (D) is oversized relative to the third arm (C) and the position of the fourth arm (D) is offset in the direction contrary to the direction of rotation of the table (11) relative to the orbital plane (P1) of the tool (12).

According to yet another embodiment of this preferred version of the invention, the position of the third arm (C) and of the fourth arm (D) are both offset in the direction contrary to the direction of rotation of the table (11) relative to the orbital plane (P1) of the tool (12).

Figure 15:
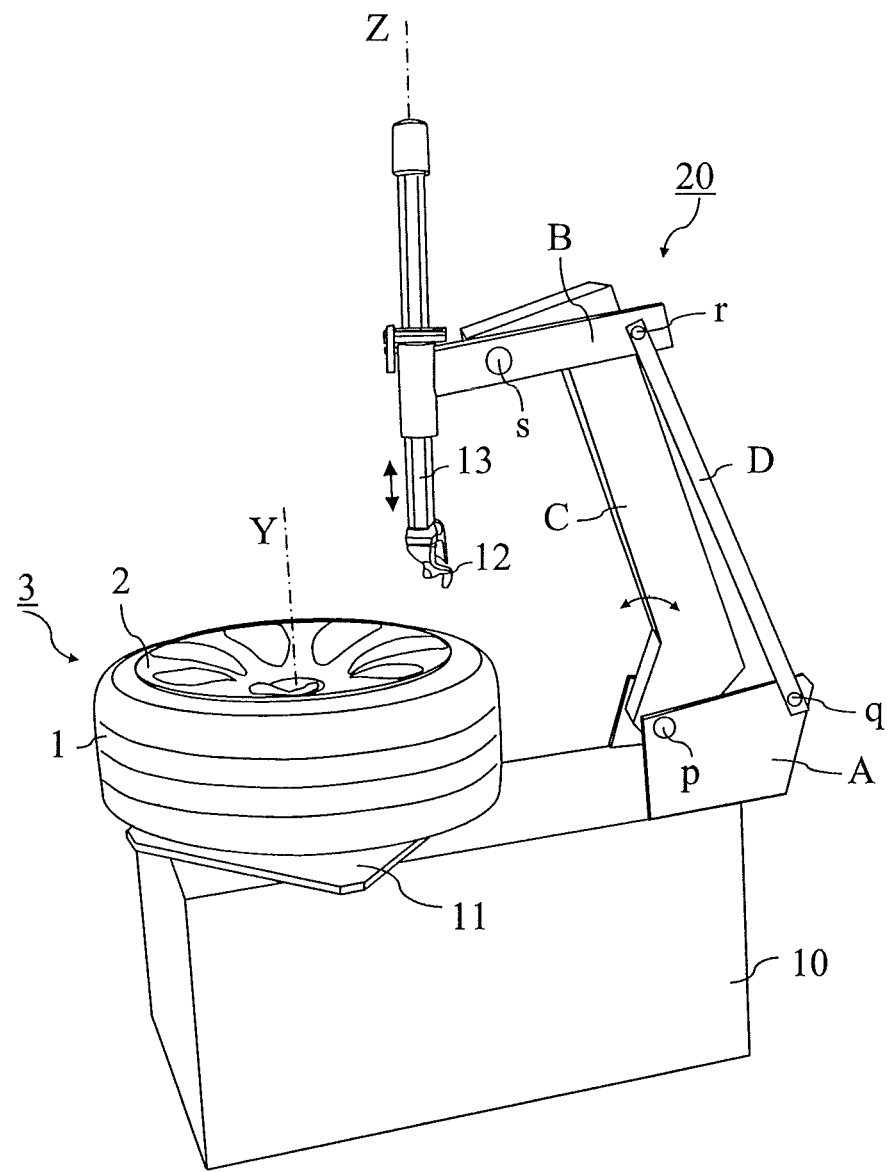
FIG. 15 shows a view in perspective of an example of a machine according to the invention.

FIG. 15 shows a view in perspective of an example of a machine according to the invention.

The present invention has been described with reference to specific embodiments which have a purely illustrative value and must not be considered limiting. In a general manner, it will be evident for those skilled in the art that the present invention is not limited to the examples illustrated and/or described above. The invention comprises each of the new features and all their combinations.

The presence of reference numbers on the drawings cannot be considered limiting, including when these numbers are indicated in the claims. The use of the verbs "comprise", "include", "contain", or any other variant, and their conjugations, can in no way exclude the presence of elements other than those mentioned. The use of the indefinite articles "a", "an" or of the definite article "the" in order to introduce an element does not exclude the presence of a plurality of these elements.

To summarize, the invention may also be described as follows:

Machine for the fitting and removal of a tire (1) from a rim (2) of a wheel (3). The machine comprises a frame (10), a rotating table (11) in order to attach the wheel thereto by its rim and to rotate the rim about its axis (Y), and a tool (12) for fitting and/or removing the tire from the rim. The tool (12) is connected to the frame (10) by means of a movable structure (20) capable of moving the tool (12) horizontally and vertically to its working position being situated close to the proximal edge (4) of the rim (2) when the wheel (3) is mounted on the rotating table (11). The movable structure (20) comprises four arms (A, B, C, D) connected together in twos by means of four pivots (p, q, r, s) the axes (X1, X2, X3, X4) of which are parallel with one another. One of the arms (A) is secured to the frame (10) and the tool (12) is connected to one of the other arms (B, C, D). The tool (12) can therefore be moved horizontally and vertically exclusively by means of rotary connections between the tool (12) and the frame (10). Moreover, the lever arm between the tool (12) and the movable structure (20) is constant and can be relatively short irrespective of the diameter of the rim (2).

The invention claimed is:

1. A machine for fitting and removing a tire (1) from a rim (2) of a wheel (3) comprising a frame (10), a rotating table (11) capable of attaching the rim (2) thereto and of rotating said rim (2) in a centered manner about an axis (Y), and a tool (12) for fitting and removing the tire (1), wherein the machine comprises a movable structure (20) having four arms (A, B, C, D), said arms being connected together two by two by means of four pivots (p, q, r, s) having respectively four pivot axes (X1, X2, X3, X4) parallel with one another, a first arm (A) is connected to a third arm (C) by means of a first pivot (p), the third arm (C) is connected to a second arm (B) by means of a fourth pivot (s), the second arm (B) is connected to a fourth arm (D) by means of a third pivot (r), the fourth arm (D) is connected to the first arm (A) by means of a second pivot (q) and where the first arm (A) is secured to the frame (10), and wherein the tool (12) is connected to one of the second, third, or fourth arms (B,C,D).

2. The machine as claimed in claim 1, wherein the axis (Y) of the table (11) is substantially in an orbital plane (P1) of the tool (12).

3. The machine as claimed in claim 2, wherein the four pivots (p, q, r, s,) substantially form a parallelogram and wherein the tool (12) is connected to the second arm (B) opposite to the first arm (A).

4. The machine as claimed in claim 3, wherein an axis (Z) of the tool (12) is parallel with the axis (Y) of the table (11).

5. The machine as claimed in any one of the preceding claims, wherein the tool (12) is connected to one of the second, third, or fourth arms (B, C, D) in a manner so as to be movable in translation along an axis (Z) of the tool (12).

6. The machine as claimed in claim 5, wherein, seen from the tool (12), the third arm (C) is of concave shape.

7. The machine as claimed in claim 6, wherein the third arm (C) is offset relative to the orbital plane (P1) of the tool (12), in the direction contrary to the direction of rotation of the table (11).

8. The machine as claimed in claim 7, wherein the fourth arm (D) is offset relative to the orbital plane (P1) of the tool (12), in the direction contrary to the direction of rotation of the table (11).

* * * * *